United States Patent [19]

Jenn

[11] 3,954,427
[45] May 4, 1976

[54] VENTILATION AND FILTER MODULE FOR COOKING UNITS

[75] Inventor: Louis J. Jenn, Indianapolis, Ind.

[73] Assignee: Jenn Air Corporation, Indianapolis, Ind.

[22] Filed: Nov. 15, 1974

[21] Appl. No.: 524,039

Related U.S. Application Data

[63] Continuation-in-part of Ser. No. 406,891, Oct. 16, 1973, abandoned.

[52] U.S. Cl. .................................... 55/217; 55/467; 55/DIG. 36; 98/115 K; 126/299 A
[51] Int. Cl.² ........................................ B01D 23/20
[58] Field of Search ........ 126/299 R, 299 A, 299 B; 98/115 K, 33 A, 1; 55/419, 467, 471, 472, 481, 484, 418, DIG. 36, 217; 417/234; 118/326, 634, DIG. 7

[56] References Cited
UNITED STATES PATENTS

| | | | |
|---|---|---|---|
| 2,221,391 | 11/1940 | Young | 55/484 |
| 3,409,005 | 11/1968 | Field | 126/300 |
| 3,616,624 | 11/1971 | Marsh | 98/115 LH X |
| 3,716,966 | 2/1973 | De Seversky | 55/472 X |
| 3,802,168 | 4/1974 | Deckas | 98/33 A X |
| 3,848,521 | 11/1974 | King | 98/115 K |
| 3,870,494 | 3/1975 | Doane | 98/115 K X |

*Primary Examiner*—William E. Wayner
*Assistant Examiner*—William E. Tapolcai
*Attorney, Agent, or Firm*—Woodard, Weikart, Emhardt & Naughton

[57] ABSTRACT

Disclosed is a free standing cooking fume and odor collecting or ventilating unit of modular construction and adapted for positioning adjacent one or more fume-generating cooking surfaces, which may be at differing vertical levels. The exhaust fan and motor, and suitable intake filters are located in the lower portion of the assembly and this lower portion accommodates, in overlying relation, one or more alternative intake modules which include intake openings adjacent the cooking surfaces or other fume producing portions of the ranges adjacent to which the collecting unit is placed.

6 Claims, 6 Drawing Figures

VENTILATION AND FILTER MODULE FOR COOKING UNITS

This is a continuation-in-part of my presently pending application Ser. No. 406,891, filed Oct. 16, 1973 and titled "Ventilation and Filter Module For Cooking Units", now abandoned.

BACKGROUND OF THE INVENTION

It is known to provide ventilation and filter means integrally mounted within or on single cooking units, such as disclosed in the patent to Field, U.S. Pat. No. 3,409,005, issued Nov. 5, 1968; the patent to Pledger, U.S. Pat. No. 2,532,420, issued Dec. 5, 1950; and the patent to Gaylord, U.S. Pat. No. 2,813,477, issued Nov. 19, 1957. Further, it is known to provide such integral or built-in filter and ventilation units between adjacent cooking units, to provide a single cooking and ventilation assembly, as shown in the patent to Pledger, U.S. Pat. No. 2,535,863, issued Dec. 26, 1950. Because they are an integral part of their cooking units, such ventilation and filter means have greatly limited the versatility of design for kitchens, particularly commercial kitchens, or at best, have required that such designs be customized for the particular job. This increases the cost of original installation of such unitary cooking and ventilating assemblies.

Further, such prior art units have had the disadvantage that there is difficulty in removing the filter units, cleaning the interior of the ventilation and filter enclosure, and servicing the blowers with their electric motors.

SUMMARY OF THE INVENTION

The present invention provides a separate, or free standing, fume and odor collecting unit of modular construction which may be positioned adjacent and between any standard type of cooking units, though of various heights, without requiring custom design. In addition, the assembly may be easily cleaned and serviced in that access is provided to the filters, blower and motor through an access door in the front face of the assembly without disturbing the cooking units. The lower module of the assembly contains the blower, motor and filters and thus a major portion of the necessary elements are thus below the level of the cooking surfaces of the adjacent ranges, so that the overall height of the complete assembly is quite low when compared to prior art structures, thus permitting better air circulation and vision within the kitchen. The upper module of the assembly, having the fume inlets and dampers, can be of relatively low height drawing gases from adjacent cooking units at substantially the same low height or can be of greater height, having multiple intake openings, to draw gases from adjacent high and low cooking units. The construction is quite simple and readily manufactured for economy of original installation and maintenance.

DESCRIPTION OF THE PREFERRED EMBODIMENT

The assembly of the present invention provides a ventilation and filtration module to be used adjacent to one or more cooking surfaces, that is, between, for example, two ranges in a commercial or institutional kitchen. The assembly is free standing and can be moved to accommodate various kitchen arrangements.

Figure 1:
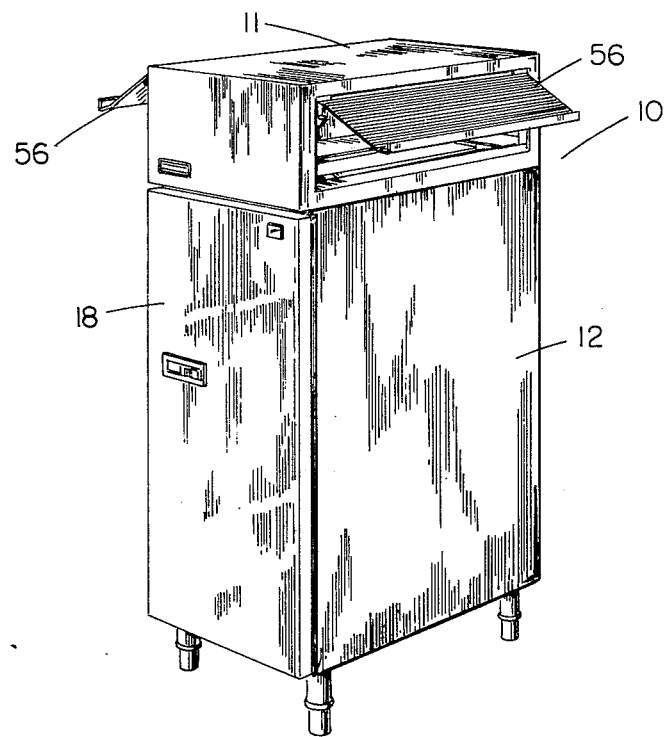
FIG. 1 is a perspective view of an assembly embodying the present invention.
Figure 6:
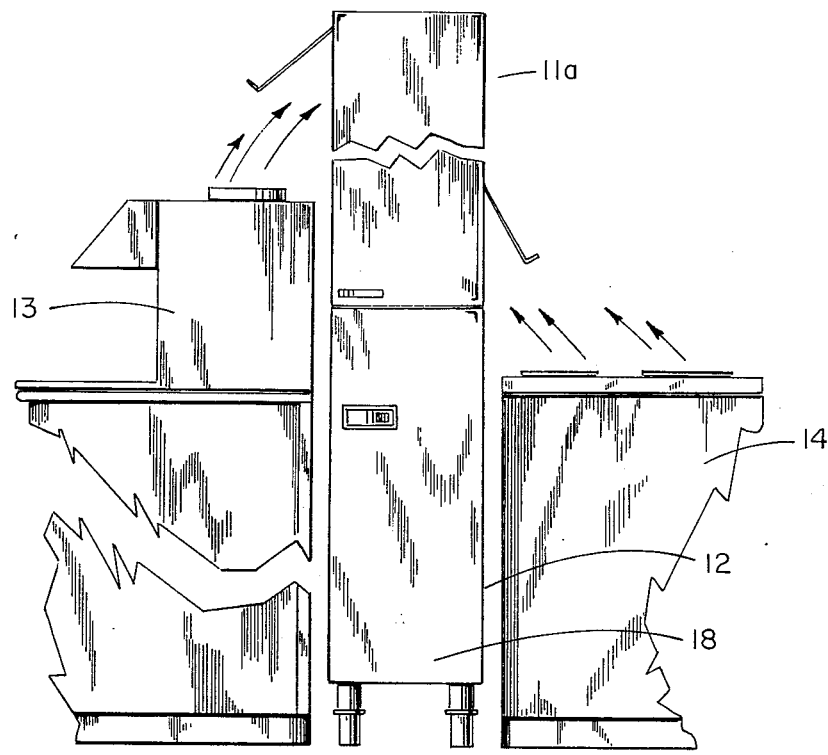
FIG. 6 is a front view of the assembly in which the upper component is of greater height than that of FIG. 3 and has multiple intakes, low and tall adjacent cooking units being illustrated fragmentarily.

As may be seen in FIG. 1 the assembly 10 is composed of an upper module 11 and a lower module 12. In FIG. 6 the adjacent cooking units serviced by the assembly are shown fragmentarily at 13 and 14. The upper module 11a differs from the module 11 of FIG. 1 in a fashion which will subsequently be described.

Figure 2:
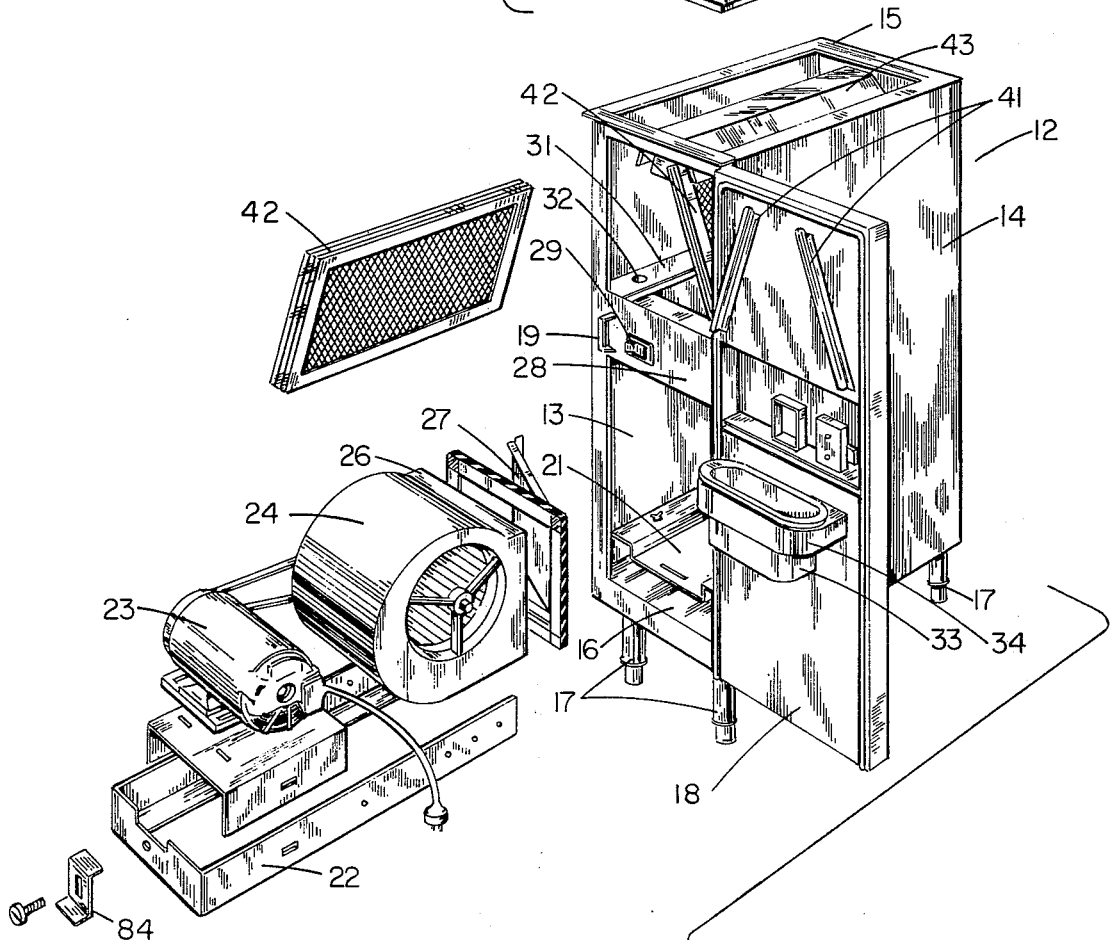
FIG. 2 is an exploded, perspective view of the lower portion of the apparatus of FIG. 1.

Referring in detail to FIG. 2 the lower portion 12 of the assembly is formed as a generally rectangular, box like structure having side walls 13 and 14 and a base 16 from which extend support legs 17. The front face of the structure is closed by an appropriately hinged door 18, which may be releasably latched closed at 19.

Bolted in place on the base 16 is a guide rail structure 21 which removably accommodates the mounting frame 22 of a belt coupled electric motor 23 and a centrifugal blower 24. The exhaust 26 of the blower accommodates a back-draft damper 27 and, at the rear of the structure 12 the damper frame is conventionally placed in register with a duct (not shown) for conducting the fan discharge to the exterior of the room or enclosure in which the assembly is located.

Figure 4:
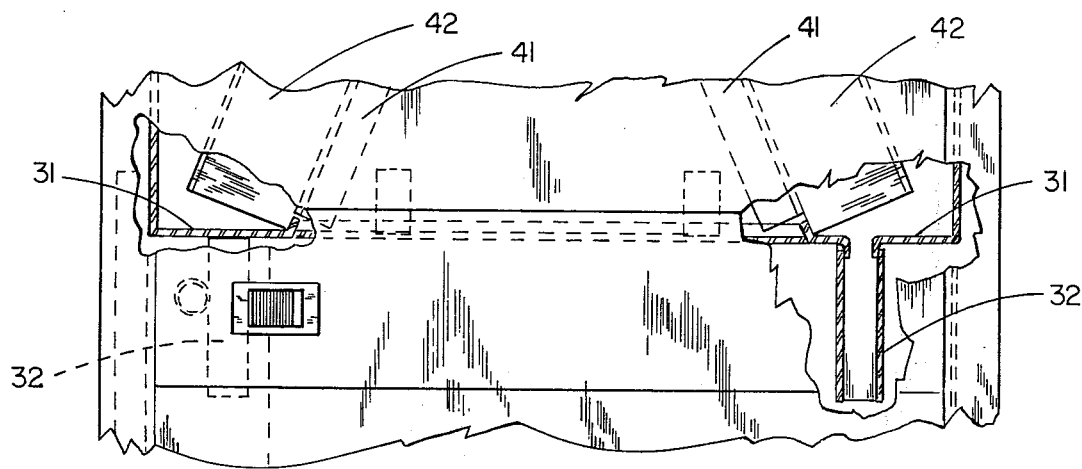
FIG. 4 is a fragmentary front view of a portion of the structure shown in FIG. 1.

A transverse member 28 extends across the front of the structure, supporting an on-off control switch 29 for motor 23 and rearwardly extending, metal, trough-forming members 31 (FIGS. 2 and 4). Drain tubes 32 depend from the troughs and empty into a grease tray or receptacle 33 removably seated in retainer 34 mounted on the inner face of door 18, the receptacle being positioned under the drain tubes when the door 18 is closed. Two inclined members 41, channel shaped in cross-section, are carried on the inner face of the upper portion of door 18 and serve to retain in place reusable filters 42. The filters rest in inclined position, as shown in FIG. 2, with their upper margins accommodated within the bracket 43 which extends rearwardly to the wall 15, bisecting the open, upper face of the lower portion 12.

Figure 3:
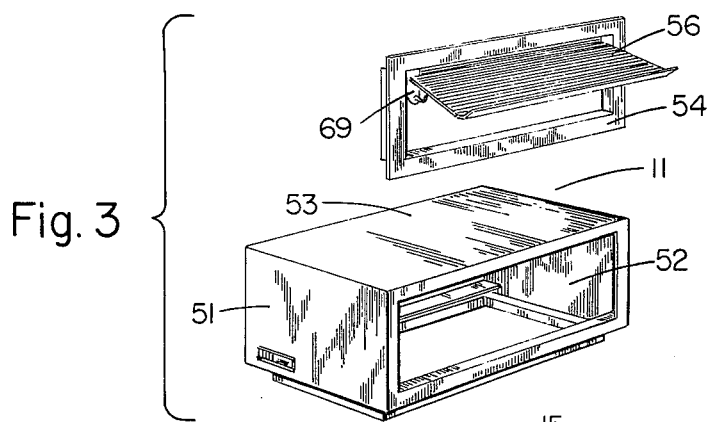
FIG. 3 is an exploded, perspective view of the upper portion of the apparatus of FIG. 1.

Overlying the open, upper face of the structure just described is the upper module 11, shown in detail in FIG. 3. The structure takes the form of a generally rectangular box having a front wall 51, rear wall 52 and closed top 53. The right hand side of the structure accommodates the frame 54 within which is hinged an intake damper 56. As will be evident from FIG. 1 and identical intake damper assembly may be located on the opposite side of module 11. The damper is hinged along the upper margin of the frame and is positionally adjustable with a fusible link release for closing the damper over the intake opening framed by member 54 as will subsequently be explained with reference to FIG. 5.

Figure 5:
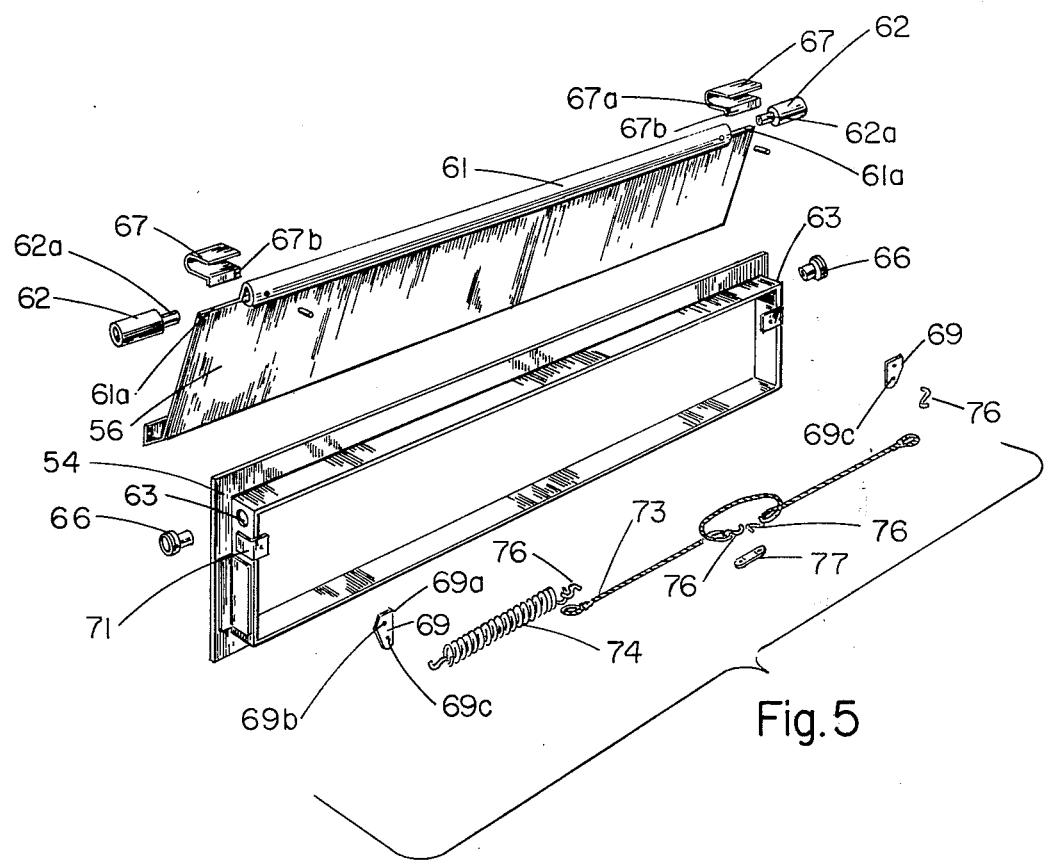
FIG. 5 is an exploded, perspective view showing the fusible link, fire safety mechanims for the inlet damper shown in FIG. 3.

Referring to FIG. 5, the bead 61 formed at the upper margin of damper 56 rigidly accommodates the ends 62a of the bearing members 62. The central opening in each of the bearing members 62 register with the apertures 63 in the extending flange portion of the frame 54. A bearing-retainer member or pintle 66 extends through opening 63 and into the member 62 at each end of the damper. The damper is thus free to pivot about the longitudinal axis of member 66, with the larger-diameter or shank portion of each of the bearing members 62 exposed by the appropriate cut-away portions. indicated at 61a, of the damper blade. Gripping the shank portion of each of the members 62 are resilient brake bands 67 which have a groove 67a formed by downwardly turned flange 67b. When in place the upper surface of the band engages the adjacent face of the frame flange. In unstressed condition the bands permit members 62 to rotate and the damper blade to freely drop, by gravity, to closed position. The bands 67 are deformed somewhat to apply friction to bearing 62 by the lobe portion 69a of cams 69 which extend into groove 67a of the bands and are pivoted to the frame at apertures 69b in the cams, the apertures receiving pivot pins which extend into brackets 71 carried by the frame. The cam lobes are held in frictional locking position by the flexible member 73, which, at its opposite ends, is connected at 69c to the pivoted cams 69, one being connected through the tension spring 74. The length of member 73 is shortened, and tension placed on spring 74 by means of hooks 76 which engage the fusible link 77. When the air moving through the intake reaches an abnormal temperature, the link 77 will melt, releasing member 73 and cams 69 so that damper blade 56 can drop to closed position.

As previously mentioned, referring to FIG. 6, the upper module might take the form indicated at 11a, identical to upper portion 11 described above in detail except that it is of greater height and its intake opening and dampers 56a and 56b are located at differing heights so that adjacent cooking surfaces of exhaust passages of differing heights can be serviced by interposing the structure between the cooking apparatus (13 and 14 in FIG. 6).

In operation, referring to FIGS. 2 and 3, operation of the blower 24 draws cooking fumes and odors into the intake opening in the upper portion 11 of the assembly. These move downwardly through the inclined filters 42 and exit through the blower discharge 26 to the exterior of the room in which the cooking apparatus is installed. Particulate matter, grease droplets etc. are caught on the filters which drain into the troughs or gutters 31 and settle in the receptacle or grease tray 33. A shroud or housing (not shown) may be provided for the motor and blower assembly carried on member 22. Should grease or other material from the adjacent cooking surfaces ignite, the consequent abnormal temperature rise will fuse the link 77, releasing the damper 56 and permitting it to drop to closed position.

Opening of door 18, provides convenient access to the filters 42 for removal and cleaning without necessitating moving of the adjacent cooking units such as those shown at 13 and 14 in FIG. 6. Access is also thus provided to the motor and blower units which can slide outwardly for access upon removal of holding bracket 84 (FIG. 2). This also provides access to the damper 27. The friction on the inlet damper pintle (when link 77 is in place) is such as to permit them to be manually positioned in the proper inclination required for the particular cooking operation undertaken.

While the invention has been disclosed and described in some detail in the drawings and foregoing description, they are to be considered as illustrative and not restrictive in character, as other modifications within the scope of the invention may readily suggest themselves to persons skilled in the art.

I claim:

1. A free-standing fume collecting unit of modular construction and adapted to be positioned immediately adjacent one or more fume-generating cooking surfaces, said unit comprising a discrete, generally rectangular base module, a powered exhaust means in said base module discharging to the exterior of said unit, removable filter elements in the base module positioned to filter the intake of said exhaust means, and a generally rectangular, discrete upper module overlying said base module with openings in the contiguous module faces to provide communication between their interiors, said upper module having at least one intake opening extending across the side of said upper module closest to a cooking surface, a positionably adjustable closure member provided for said intake opening movable between adjusted open position and fully closed position, and abnormal temperature responsive means for moving said closure member to fully closed position upon the existence of a predetermined abnormal temperature at said intake opening, whereby air and fumes moving from said cooking surface are drawn through said intake opening, move through said upper module into said base module to be discharged at the exterior of the unit by said exhaust means and said intake opening is closed upon occurrence of an abnormal temperature in the entering air and fumes.

2. A fume collecting unit as claimed in claim 1 in which said closure member is pivotally supported adjacent its upper margin, and said abnormal temperature responsive means includes a tension member having a fusible link for retaining said closure member in open position, an abnormal increase in temperature of the entering air serving to melt said link to release said tension member and permit said closure member to move to its closed position.

3. A fume collecting unit as claimed in claim 1 in which said base module is provided with a door to permit access to said filter elements and said exhaust means.

4. A fume collecting unit as claimed in claim 1 in which said upper module is provided with intake openings on opposite sides of said module and at differing vertical positions on the module side walls.

5. A fume collecting unit as claimed in claim 2 in which said closure member is provided with bearing members extending from opposite side margins of said closure member and accommodating stationary pintles to provide a pivot axis for the closure member, a friction band extending into frictional engagement with each of said bearing members for providing a frictional force resisting rotation of the bearing members and to maintain said closure member in any selected position between its full open and closed positions, said tension member extending between said friction bands to maintain said frictional force and to release it when said link melts.

6. A free-standing fume collecting unit of modular construction and adapted to be positioned immediately adjacent one or more fume-generating cooking surfaces, said unit comprising a discrete, generally rectangular base module, a powered exhaust means in said base module discharging to the exterior of said unit, removable filter elements in the base module positioned to filter the intake of said exhaust means, a door provided on said base module to permit access to said filter elements and exhaust means, a receptacle on the inner face of said door for collecting grease trapped by said filter elements, and a generally rectangular, discrete upper module overlying said base module with openings in the contiguous module faces to provide communication between their interiors, said upper module having at least one intake opening extending across the side of said upper module closest to a cooking surface, whereby air and fumes moving from said cooking surface are drawn through said intake opening, move through said upper module into said base module to be discharged at the exterior of the unit by said exhaust means.

* * * * *